(12) United States Patent
Manassen

(10) Patent No.: US 8,209,767 B1
(45) Date of Patent: Jun. 26, 2012

(54) NEAR FIELD DETECTION FOR OPTICAL METROLOGY

(75) Inventor: Amnon Manassen, Haifa (IL)

(73) Assignee: KLA-Tencor Corporation, Milpitas, CA (US)

( * ) Notice: Subject to any disclaimer, the term of this patent is extended or adjusted under 35 U.S.C. 154(b) by 177 days.

(21) Appl. No.: 12/828,112

(22) Filed: Jun. 30, 2010

(51) Int. Cl.
*G02F 1/01* (2006.01)
*G01J 4/00* (2006.01)

(52) U.S. Cl. .................... 850/30; 850/3; 850/21

(58) Field of Classification Search ............. 850/3, 21, 850/30, 32
See application file for complete search history.

(56) References Cited

U.S. PATENT DOCUMENTS

| | | | |
|---|---|---|---|
| 6,232,597 B1 * | 5/2001 | Kley | 250/234 |
| 6,913,982 B2 * | 7/2005 | Lim et al. | 438/378 |
| 6,953,927 B2 * | 10/2005 | Quake et al. | 250/234 |
| 7,129,454 B2 * | 10/2006 | O'Connell et al. | 250/201.3 |
| 7,562,564 B2 * | 7/2009 | Baba et al. | 73/105 |
| 7,770,231 B2 * | 8/2010 | Prater et al. | 850/6 |
| 7,888,663 B2 * | 2/2011 | Zhou et al. | 250/504 R |
| 7,977,636 B2 * | 7/2011 | Raschke | 250/338.1 |
| 8,116,174 B2 * | 2/2012 | Nishida et al. | 369/13.33 |
| 2002/0008304 A1 * | 1/2002 | Lim et al. | 257/623 |
| 2003/0107058 A1 * | 6/2003 | Lim et al. | 257/255 |
| 2006/0118696 A1 * | 6/2006 | O'Connell et al. | 250/201.3 |
| 2008/0068589 A1 * | 3/2008 | Hess et al. | 356/36 |
| 2008/0208545 A1 * | 8/2008 | Lin et al. | 703/2 |
| 2009/0261250 A1 * | 10/2009 | Zhou et al. | 250/307 |
| 2010/0118664 A1 * | 5/2010 | Nishida et al. | 369/13.33 |
| 2010/0154084 A1 * | 6/2010 | Sokolov et al. | 850/1 |
| 2011/0321204 A1 * | 12/2011 | Karaki et al. | 850/32 |

* cited by examiner

*Primary Examiner* — David A Vanore
(74) *Attorney, Agent, or Firm* — Joshua D. Isenberg; JDI Patent

(57) ABSTRACT

An optical metrology tool may include a source of electromagnetic radiation having a characteristic wavelength, an objective having a central obscuration, a near field element located within the central obscuration of the objective, and an electromagnetic radiation detector coupled to the near field element. A mechanism is configured to bring the near field element into proximity to the target. A characteristic dimension of the near field element is sufficient smaller than the wavelength of the electromagnetic radiation that when the electromagnetic radiation passes through the cavity and the cavity is in sufficient proximity to the target that evanescent waves can couple energy from propagating radiation in the near-field element to the target. The detector detects an optical signal due to the evanescent waves coupling to the target.

25 Claims, 12 Drawing Sheets

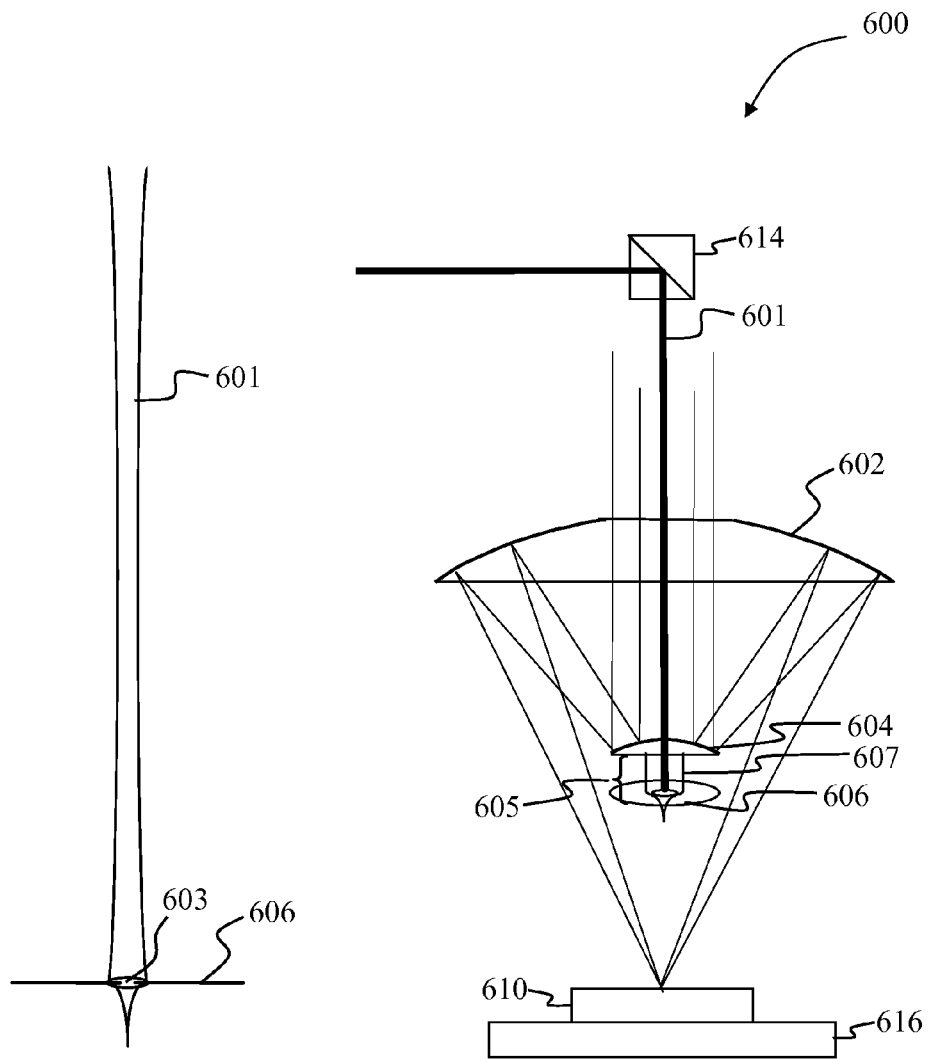
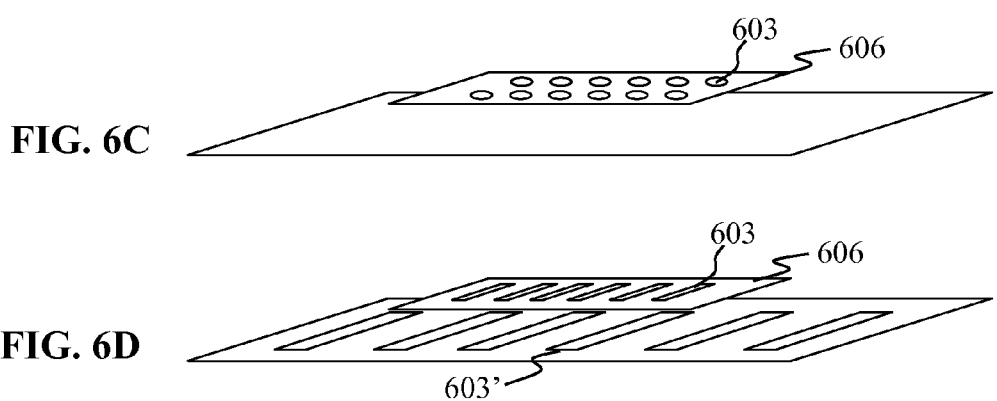
FIG. 6A   FIG. 6B
FIG. 6C
FIG. 6D

NEAR FIELD DETECTION FOR OPTICAL METROLOGY

FIELD OF THE INVENTION

This invention generally relates to optical metrology and more particularly to implementing optical near field detection for optical metrology.

BACKGROUND OF THE INVENTION

The semiconductor industry often uses far field optical imaging tools such as microscopes or scatterometers for wafer inspection and metrology. Such tools typically couple light from a source to a target through an objective lens. Light scattered from the target is coupled back through the objective to an imaging detector via an optical column. Such far-field optical tools can operate quite quickly and can obtain three-dimensional information about a target.

Another class of imaging tools includes electron microscopes, such as the scanning electron microscope (SEM). The SEM can form an image of a target using an electron beam instead of light. The SEM operates in a similar manner to an optical microscope. Instead of an optical beam, an electron beam is coupled to the target through an objective and secondary electrons from the target are coupled back through the objective to a detector through an electron optical column.

Yet another class of tools used for inspection and metrology is known as scanning probe tools. Such tools use a small probe that is mechanically scanned across a target. Atomic scale interactions between the target and the probe can be detected and amplified and converted to an image as the probe is scanned across the target.

As the components of semiconductor devices shrink to smaller and smaller sizes, presently on the order of a few nanometers, the ability to improve metrology performance, productivity, and device correlation becomes critically important. To determine the alignment of features formed in one layer with respect to features formed in a previous or subsequent layer, metrology targets are often formed in one or more of the layers. The metrology targets facilitate measurement of the dimensions of features and alignment, e.g., overlay between the features, using a metrology tool such as microscope or scatterometer or critical dimension (CD) with SEM or scatterometer.

One of the main obstacles in achieving these metrology requirements with optical based technologies is the large wavelength of the relevant spectral bands and the consequent limited resolution. These limitations are relevant to common far field technologies. Conventional optical metrology methods are based on propagating optical waves and as such are limited by wavelength range resolutions.

Unfortunately, in an optical system operating in a far-field mode, the spatial resolution is diffraction limited. The diffraction limit in traditional optics is imposed by the use of propagating waves in the imaging process. Generally, the lateral spatial resolution d is given by the Rayleigh criterion:

$$d = \frac{1.22\lambda}{NA}$$

where $\lambda$ is the wavelength of the light being imaged and NA (the numerical aperture) is equal to $n \sin \theta$, where $\theta$ is half of the angular aperture on the object side and n is the refractive index of the medium above the object.

One way of overcoming the diffraction limit for an optical system is to use an electron beam system, such as a scanning electron microscope (SEM). Because the SEM uses electrons instead of light SEM can measure much smaller features than can be measured with optical systems. However, a key difference between a conventional SEM and an optical microscope is that an SEM must operate with the target under vacuum. This can slow down the rate at which an SEM can inspect or measure different wafers and also makes an SEM system more expensive and complex. In addition, SEM typically requires that the target be made of an electrically conductive material. Non-conductive materials can be coated with a thin layer of conductive material, e.g., gold, prior to SEM measurements. Unfortunately, such coatings may alter the target, e.g., by obscuring very small scale features.

Furthermore, scanning probe technologies, such as Atomic Force Microscope (AFM), Scanning Tunneling Microscope (STM) and electronic microscope, are best suited for measuring two-dimensional information and have limited ability to provide three-dimensional information. In addition, the measurement and imaging process with scanning probe tools is slow.

The diffraction limit can be overcome by techniques that include near-field radiation (sometimes referred to as evanescent waves) in the detection process. One example of a technique for overcoming the diffraction limit using near-field radiation is described in commonly-assigned U.S. patent application Ser. No. 12/256,324, filed Oct. 22, 2008 entitled SYSTEMS AND METHODS FOR NEAR-FIELD HETERODYNE SPECTROSCOPY, by Guorong V. Zhuang, John Fielden, and Christopher F. Bevis, the entire contents of which are incorporated herein by reference. In this system a target is probed using a probe beam and a modulated pump beam. A near-field generation device receives the modulated pump beam, generates a modulated near-field beam, and directs the modulated near-field beam to a point on the sample that is probed with the probe beam. A reflected probe beam is detected, demodulated, and analyzed. However, this system detects the reflected probe beam in far field as opposed to the near field.

It is within this context that embodiments of the present invention arise.

BRIEF DESCRIPTION OF THE DRAWINGS

Objects and advantages of the invention will become apparent upon reading the following detailed description and upon reference to the accompanying drawings in which:

FIGS. 6A-6B are schematic diagrams illustrating the use of a sub-wavelength aperture as a near-field element in a metrology tool having a reflective objective in accordance with another alternative embodiment of the present invention.

FIGS. 6C-6D are schematic diagrams illustrating use of arrays of sub-wavlength apertures as near-field elements in alternative embodiments of the present invention.

DESCRIPTION OF THE SPECIFIC EMBODIMENTS

Figure 1:
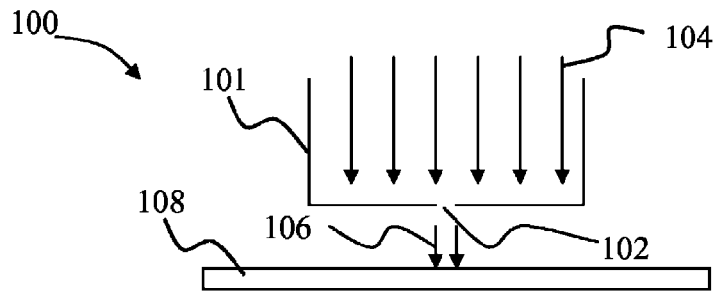
FIG. 1 is a cross-sectional view illustrating a near field device according to an embodiment of the present invention.

Although the following detailed description contains many specific details for the purposes of illustration, anyone of ordinary skill in the art will appreciate that many variations and alterations to the following details are within the scope of the invention. Accordingly, the examples of embodiments of the invention described below are set forth without any loss of generality to, and without imposing limitations upon, the claimed invention.

Introduction

The maximum resolution for an optical microscope is typically limited by how tightly the beam of light could be focused. In scanning optical microscopy, laser light is fed via an optical fiber to an aperture that is scanned across a target. Due to diffraction of the light, the size of the aperture normally determines the resolution obtainable. As noted above, the diffraction limit can be overcome through the inclusion of evanescent waves in the optical detection process. There are a number of promising techniques for including evanescent waves in optical detection. Such techniques include, near-field techniques such as near-field scanning optical microscopy, sub-wavelength aperture imaging, and super lenses.

Near-field scanning optical microscopy (NSOM), sometimes called scanning near-field optical microscopy (SNOM) is a microscopic technique for nanostructure investigation that breaks the far field resolution limit by exploiting the properties of evanescent waves. NSOM involves preparation of an evanescent wave coupled to a detectable propagating wave at some point proximate a target and scanning of this point detection over the target. An evanescent wave is a near-field standing wave with an intensity that exhibits exponential decay with distance from the boundary at which the wave was formed. They are formed at the boundary between two media with different wave motion properties, and are most intense within one-third of a wavelength from the surface of formation.

Near-field scanning optical microscopy (NSOM) permits imaging beyond the far-field visible diffraction limit (~200 nm) with the capability of performing high spatial resolution (~10-50 nm) optical spectroscopy. This is done by placing the detector very close (distance much smaller than wavelength $\lambda$) to the specimen surface. This allows for surface inspection with high spatial, spectral and temporal resolving power. With this technique, the resolution of the image is limited by the size of the detector aperture and not only by the wavelength of the illuminating light. As in optical microscopy, a contrast mechanism can be adapted to study different properties, such as refractive index, chemical structure and local stress. Dynamic properties can also be studied at a sub-wavelength scale using this technique.

Super-lenses are enabled by the use of meta-materials in which sub-wavelength structures are designed to yield an electronic response in opposite phase to electro-magnetic fields. Such an opposite phase response can result in negative electric permittivity and negative magnetic permeability and therefore negative refractive index. Super-lenses are described in detail by Xiang Zhang and Zhaowei Liu in "Super-lenses to overcome the diffraction limit" in Nature Materials, VOL 7, JUNE 2008, the entire contents of which are incorporated herein by reference.

Zhang and Liu describe an optical superlens made using a thin layer of silver, which can exhibit a negative electric permittivity if the layer is sufficiently thin and if the surfaces on either side of the superlens are sufficiently flat. In the case of visible wavelengths, negative electric permittivity is sufficient given that the bottom of the superlens is located a sub-wavelength distance from the object. Superlenses can be similarly made using silicon carbide and by laminating several thin layers of silver or silicon carbide together. Zhang and Liu also describe superlenses made using photonic crystals. The key to this type of superlens is to design an appropriate dispersion so as to achieve negative refraction for all angles. Such superlenses enable imaging of a near-field image from one point in space to another point in space.

A simple thin slab type superlens (referred to as a near field superlens) is only capable of projecting a sub-diffraction-limited image in the near field since the evanescent waves would continue to decay away from such lenses. The basic superlens concept can be enhanced, however, to bring the information from the near field image into the far field so that the near field image can be observed with conventional optics. By adding additional nanoscale corrugations (e.g., a sub-wavelength grating) onto the top surface of a thin-slab superlens a near field image can be projected into the far field and imaged with conventional optics. Such a superlens is referred to as a far-field superlens. A far-field superlens capable of working at visible wavelength has been investigated that uses a sub-wavelength grating on top of a silver slab.

Embodiments

In an embodiment of the present invention, a near field optical probe is located within the central obscuration of the objective of an optical metrology or inspection tool. The near field optical probe includes an optical cavity with at least one opening configured to face a target. A width of the opening is smaller than the wavelength of the electromagnetic radiation. The near field optical probe includes a mechanism configured to bring the optical cavity into proximity to the target.

When the optical cavity is brought into sufficient proximity to a target evanescent optical waves emanating from the cavity through the opening can be coupled to both the target and a propagating wave inside the cavity. Interaction between the evanescent wave and the target can change in the coupling between the near field radiation and the propagating wave. Changes in the coupling between the near field wave and the propagating wave can be detected. This technique can detect changes in a multitude of optical properties, such as intensity, wavelength, phase and polarization. The changes in these properties can be related to the characteristics of the target.

By placing the near field optical probe in the central obscuration of the objective, embodiments of the present invention allow images of the target to be obtained quickly so that areas of interest can be located. If these areas of interest contain small-scale features, the near field optical probe can be brought into proximity to the target for near field probe measurements. Such a system combines the best features of far field and near field optical techniques into a single tool.

FIG. 1 is a cross-sectional view illustrating a near field optical probe 100 that can be used in conjunction with embodiments of the present invention. As shown in FIG. 1, the near field probe 100 includes an optical cavity 101 and a small opening 102. The opening 102 is preferably a sub-wavelength opening, i.e., one that is smaller than a wavelength of electromagnetic radiation that can propagate in the cavity 101. By way of example, and not by way of limitation, the near field probe 100 may be in the form of a superlens, which can be made, e.g., of 100 nm thick gold foil. When propagating states of radiation 104 in the cavity 101 interact with the foil, surface-plasmon waves can form in the foil at wavelengths less than the wavelength of the radiation 104. The opening 102 can act as an antenna for evanescent optical waves 106 to couple energy from the plasmon waves out of the optical cavity 101.

Figure 2A:
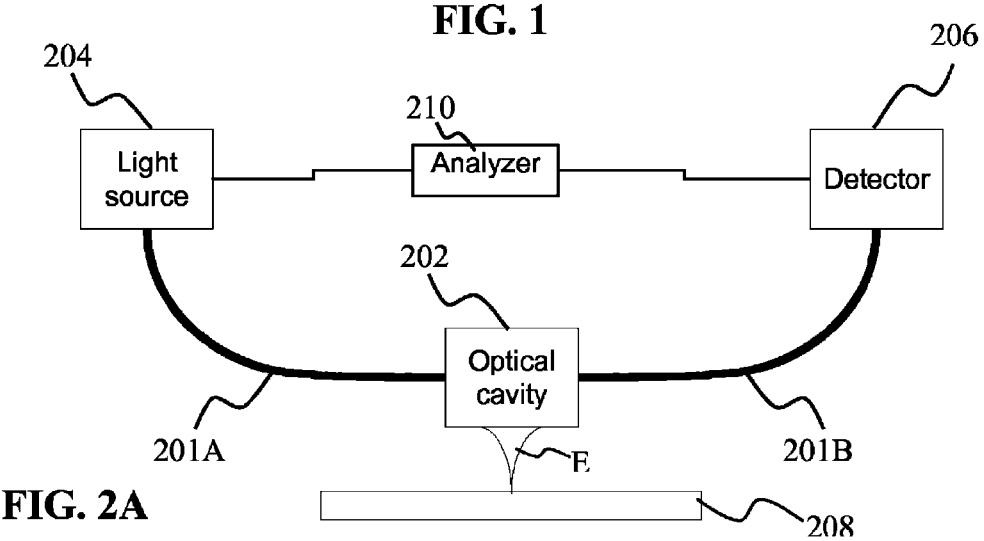
FIGS. 2A-2C are schematic diagrams illustrating different near field sensing modes using the near filed device of the type shown FIG. 1.
Figure 2B:
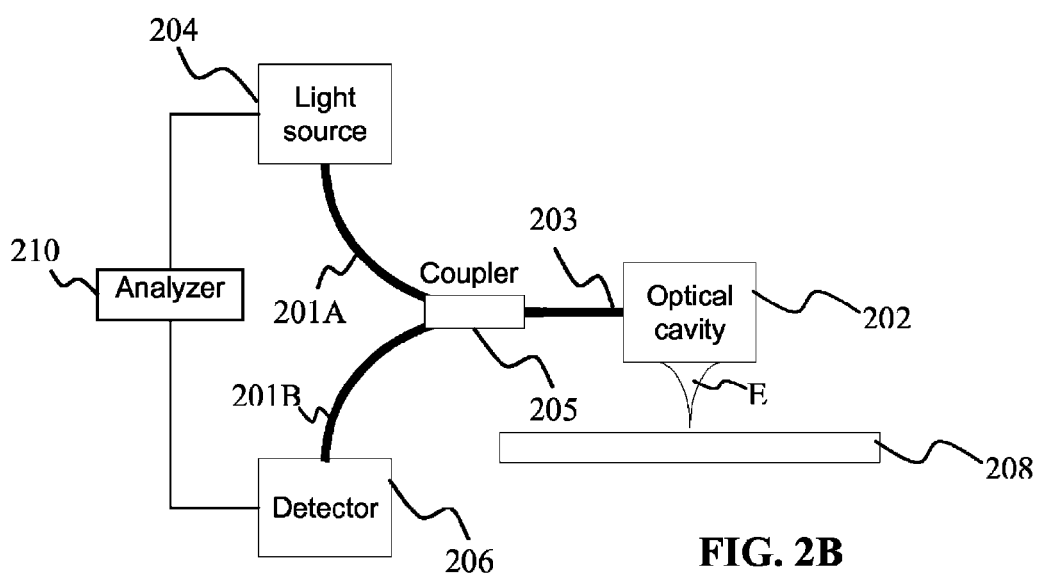
Figure 2C:
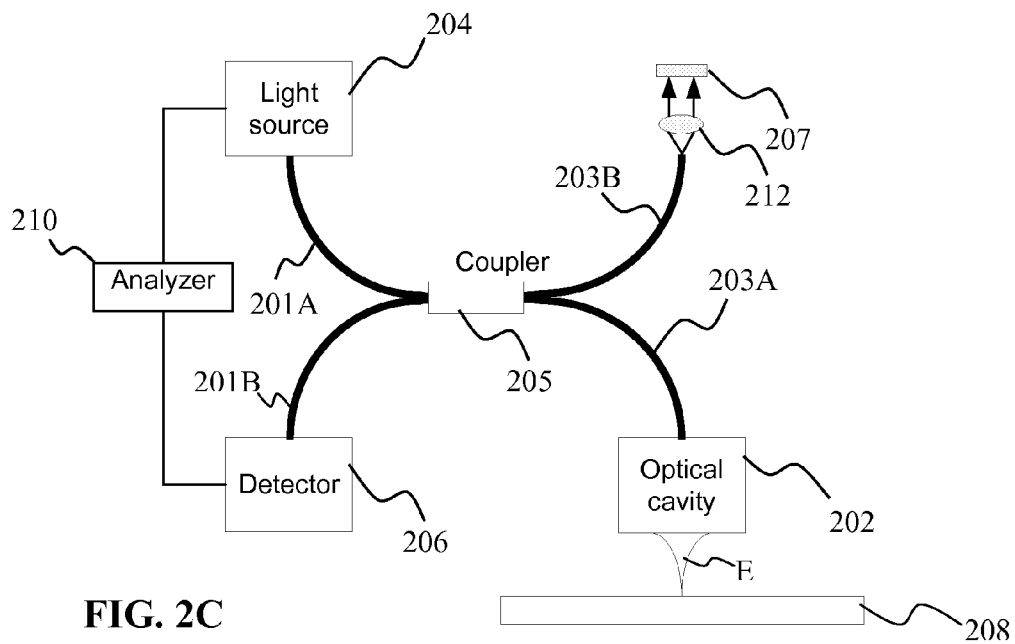

In the implementation of near field techniques into the nanometer scale semiconductor metrology and inspection, the near field device 100 can be mounted to a translation stage, such as a piezoelectric tube (PZT) that can impart nanometer scale movement to the cavity 101 and bring it to the proximity of the target 108. When the evanescent wave 106 is brought proximity to a target 108, the affect of coupling of the near field radiation to the target 108 can affect the propagating states of the radiation 104 in the optical cavity 101. The propagating states of the radiation 104 can be coupled to and from the optical cavity 101 by suitable waveguides, e.g., optical fibers as shown in FIGS. 2A-2C. Differences in propagating states coupled into and out of the cavity 101 can be detected and converted to a difference signal. The differences in the propagating states of the electromagnetic radiation 104 can be analyzed in terms intensity, wavelength, polarization and phase.

Depending upon the sample being imaged, there are multiple sensing modes for the near field device.

FIG. 2A is a schematic diagram illustrating operation of a near field optical probe of the type shown in FIG. 1 in a transmission mode. As shown in FIG. 2A, a near field element 202, such as an optical cavity is optically coupled by optical fibers 201A, 201B to a radiation source 204 and a detector 206 respectively. Light travels from the light source 204 through the near field element 202 from source to detector. If the near-field element 202 is an optical cavity, a small opening allows evanescent waves E to optically couple energy from propagating states in the cavity to a target 208. Changes in the propagating states in the optical cavity can be detected at the detector 206, e.g., in terms intensity, wavelength, polarization or phase. The detector 206 can produce a difference signal corresponding to these changes. The difference signal from the detector 206 can be coupled to an analyzer 210, e.g., a special purpose computer or suitably programmed general purpose computer. The analyzer 210 can be configured to determine properties of the target 208 from the difference signal. The analyzer 210 can optionally receive signals obtained from radiation emanating from the source 204 to measure differences in radiation coupled to and from the cavity.

There are a number of different types of measurement that can be made using this configuration. For example critical dimension (CD) can be measured by translating a periodic grating target 208 in a direction perpendicular to the target's grating and measuring the periodic optical signal obtained when the evanescent wave travels above the periodic target. In case each period of the target is a compound structure, each period of the detected optical signal could also have a structure that can be analyzed. Due to the exponential nature of the evanescent wave, performing the lateral scan at different object—probe distances, can also yield additional information on the structure of the target.

FIG. 2B is a schematic diagram illustrating operation of a near field optical probe of the type shown in FIG. 1 in a reflection mode. As shown in FIG. 2B, an optical cavity 202, light source 204 and detector 206, can all be optically coupled by optical fibers 201A, 201B, 203 respectively to an optical coupler 205. Radiation from a source 204 can be coupled to and from the optical cavity 202 via the optical coupler 205 and fiber 203. A small opening in the cavity 202 allows evanescent waves E to optically couple energy from propagating states in the cavity 202 to a target 208. Changes in the propagating states in the optical cavity 202 can be detected at the detector 206, e.g., in terms intensity, wavelength, polarization or phase. The detector 206 can produce a difference signal corresponding to these changes. The difference signal from the detector 206 can be coupled to an analyzer 210, e.g., a special purpose computer or suitably programmed general purpose computer. The analyzer 210 can be configured to determine properties of the target 208 from the difference signal. The analyzer 210 can optionally receive signals obtained from radiation emanating from the source 204 to measure differences in radiation coupled to and from the cavity 202.

The configuration shown in FIG. 2B can be used to make measurements similar to those described above with respect to FIG. 2A. The configuration shown in FIG. 2B has an advantageous optical system design due to the use of a single fiber 203 to couple light to and from the optical cavity 202. The use of a single fiber facilitates background rejection. As in the configuration shown in FIG. 2A, Z scan can support film thickness measurement in a configuration like the one shown in FIG. 2B.

FIG. 2C is a schematic diagram illustrating operation of a near field optical probe of the type shown in FIG. 1 in a phase control mode. As shown in FIG. 2C, an optical cavity 202, radiation source 204, reflector 207 mounted on a pzt, and a detector 206, are respectively coupled by optical fibers 203A, 201A, 203B, 201B to an optical coupler 205 in an interferometer configuration. A portion of the radiation from the source 204 can be coupled to the reflector 207 via the optical coupler 205 and a lens 212. Light coupled to the reflector 207 acts as a reference beam. The reference beam can be coupled from the reflector 207 to the detector 206 via fiber 203B, the optical coupler 205 and fiber 201B.

The optical coupler 205 can direct another portion of the radiation from the source 204 (referred to as a sample beam) to the optical cavity 202. A small opening in the cavity 202 allows evanescent waves E to optically couple energy from propagating states in the cavity 202 to a target 208. Changes in the propagating states in the optical cavity 202 affect the phase of radiation in the sample beam that is coupled to the detector 206 from the cavity 202 via fiber 203A, the coupler 205, and fiber 201B. Changes in phase can be detected at the detector 206 through interference of the sample beam and the reference beam at the detector 206. A phase-dependent signal from the detector 206 can be coupled to an analyzer 210. The analyzer 210 can be configured to determine properties of the target 208 from the phase-dependent signal. The analyzer 210 can optionally receive signals obtained from radiation emanating from the source 204 to measure differences in radiation coupled to and from the cavity 202.

When the near optical cavity 202 is brought into operation, the near field optical probe can be operated as a near field scanning optical microscope. The sub-wavelength opening can be scanned across the target 208. There are several types of sub-wavelength openings depending on the application benefits and measurement sequence. The sub-wavelength opening can be a spot, line or any other shape that is found to be optimal for performance. Some examples of different scanning modes that can be used in conjunction with different configurations of the opening in the cavity are illustrated in FIGS. 3A-3D.

Figure 3A:
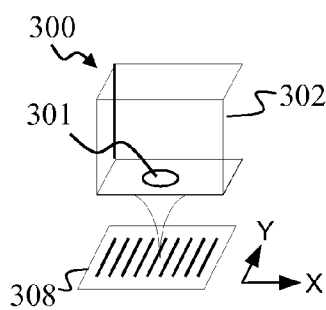
FIGS. 3A-3D are schematic diagrams illustrating different scanning modes for a near field device of the type shown FIG. 1.

As shown in FIG. 3A, an optical cavity 302 for a near field probe 300 can include a single opening 301 for use in a spot scanning mode. In this mode, the cavity 302 can be scanned relative to a target 308 along X and Y directions that are parallel to a plane of the target. In one example, the opening 301 can be more or less circular and the characteristic dimension of the opening 301 can be the diameter of the opening. The diameter can be less than a wavelength of radiation for propagating modes of radiation in the cavity 302.

Figure 3B:
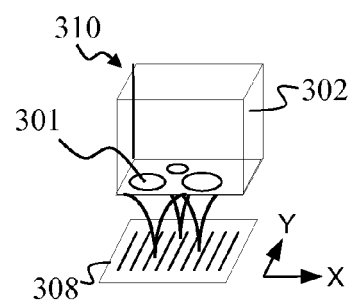

In a variation on the version shown in FIG. 3A, an optical cavity 302 for a near field probe 310 shown in FIG. 3B can include multiple spot openings for multiple spot scanning mode in X and Y directions. In this example, each spot opening may have a diameter that is less than a wavelength of radiation for propagating modes of radiation in the cavity 302. Different spot openings can have different diameters, which can be chosen for coupling energy from propagating modes of different wavelengths to the target 308.

There are a number of different ways to analyze the effect of the evanescent wave coupling on the propagating modes. For example, broadband light may be fed into the optical cavity 302 and compare the input and output spectra. Alternatively, narrow band light could be coupled to the cavity 302 and the effect on the propagating modes may be observed as the central wavelength of the narrow band light changes. If the openings 301 are far enough apart (e.g., >2 microns) then possibly band filters can be prepared above each opening to enable combined spectral and lateral scanning. In this case each of the illumination schemes mentioned could work. Alternatively, the far field side of the opening 301 could be imaged as discussed below. Using a single wavelength in such a case can obtain more information about the target with fewer scanning steps.

Figure 3C:
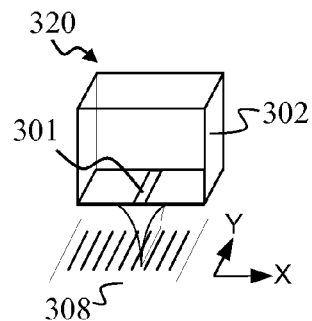
Figure 3D:
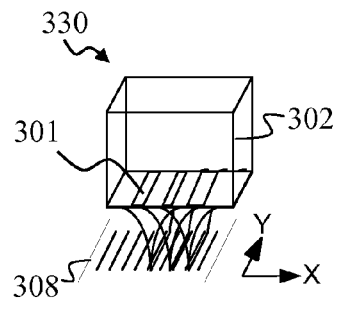

Although circular openings are depicted in FIG. 3A and FIG. 3B, embodiments of the present invention are not restricted to a particular shape of the opening in the cavity 302. For example, small opening can be a line as shown in FIGS. 3C-3D. In particular an optical cavity 302 for a near a field probe 320 of FIG. 3C includes a line opening 301 for use in a linear scanning mode. In this example, the characteristic dimension of the opening 301 can be a width of the linear opening 301. In this mode, the line opening can be oriented along the Y direction parallel to the target 308. The cavity 302 can be scanned in the X direction parallel to the target and perpendicular to the Y direction. This mode can be useful, e.g., if features of interest on the target 308 are linear features oriented parallel to the Y direction. In a variation on the probe depicted in FIG. 3C, the optical cavity 302 for a near field probe 330 of FIG. 3D can include multiple line openings 301. In this case, each line opening 301 can have a width that is less than a wavelength for propagating modes of radiation in the cavity 302. In some embodiments each line opening 301 may have a different width and the effect on propagating modes of different wavelengths could be analyzed.

As mentioned above, as the cavity 302 is scanned over the target and evanescent waves associated with the opening(s) can couple to the target 308, changing the characteristics of the propagating waves within the cavity. The changes can be detected and characterized in terms of intensity, wavelength, polarization or phase of the radiation. Information about the changes in the propagating modes can be used either directly, in case of simple large targets, or further analyzed with a dedicated model to obtain the details of the near field device and/or the target. For example, a periodic CD target can be scanned to produce a periodic signal that can be analyzed to determine properties of the target, such as pitch, CD, side wall angle, thickness, optical constants, and the like.

As discussed above, the near field probe can be located in an obscuration of the objective of an optical inspection or metrology system. As used herein, the term "obscuration" refers to a region of space proximate the target from which the objective gathers no light during optical measurements. In some optical inspection or metrology tools, light may be coupled to the target through the objective during optical measurements. Consequently, the term "obscuration" can also refer to a region of space proximate the target to which the objective supplies no light during optical measurements.

The near field probe can be mounted to the same mechanical structure as the objective. By mounting the probe in this way, an existing optical tool can be readily modified to add a scanning probe capability. For example, many inspection and metrology tools include a stage for mounting the sample. The stage often includes a mechanism for translating or rotating the target. This mechanism can be used to scan the target in the X and Y directions. The tool may also include a Z translation mechanism to allow translation of the stage along a Z direction that is perpendicular to the X and Y directions. Such a capability is often included to facilitate focusing of the objective of the target. This Z-translation capability can be incorporated into the target stage or into the mounting of the objective or an entire optical column of which the objective is a part. This mechanism can be used to bring the near field probe into sufficient proximity to the target to allow coupling of evanescent waves for NSOM.

In general, the optical cavity of the near field probe can be located between an outmost optical element (e.g., lens or mirror) of the objective and the target. It is By way of example, and not by way of limitation, a near field optical probe can be combined with an optical metrology or inspection tool that employs a reflective or catadioptric objective. In this case, the optical cavity of the near field probe can be located in the objective's central obscuration, when not needed and brought into proximity to the target when required. Such a configuration can save space as well as time of the navigation step as the near field device is already above the target measured previously by the method using the reflective objective. In some implementations the optical tool may include a reflective objective for the purpose of navigating the near field probe over the target, which can be a challenge for near field probes.

Figure 4:
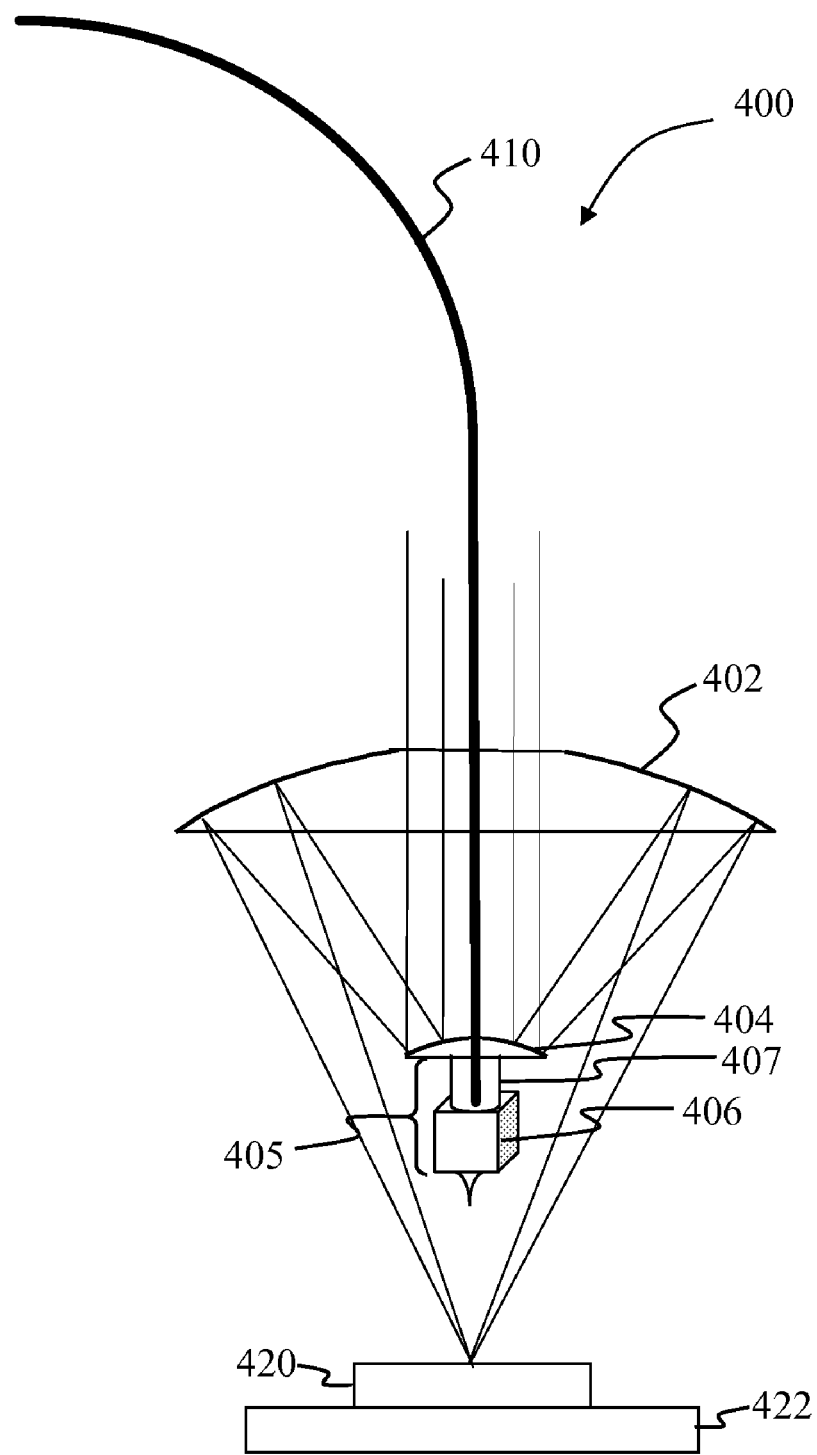
FIG. 4 is a schematic diagram illustrating a reflective objective combined with a near field device in accordance with an embodiment of the present invention.

FIG. 4 is a schematic diagram illustrating a reflective objective 400 having a mounted near field optical probe cavity according to an embodiment of the present invention. The reflective objective 400 can include a primary mirror 402 and a secondary mirror 404, which can be rigidly fixed relative to each other by a frame. In this type of objective, the primary mirror 402 is a concave (focusing) mirror and the secondary mirror 404 is a convex (diverging) mirror. The primary and secondary mirrors are configured such that parallel light (e.g., illumination from the illumination optics) can reflect from the secondary mirror 404 towards the primary mirror 402, which focuses the light onto a sample 420. Equivalently, divergent light originating from the sample 420 can reflect from the primary mirror 402 towards the secondary mirror 404, which reflects the light as a parallel beam headed up the optical column. The reflective objective 400 includes a near field device 405 having an optical near field element 406, e.g., a cavity of the type depicted in FIG. 1, located in the obscuration created by the secondary mirror 404. The near-field element 406 can be mounted to the secondary mirror 404 by a mechanism 407, which is configured to bring the optical cavity into sufficient proximity to the sample 420 that evanescent waves can be coupled between the near-field element 406 and the target 420.

By way of example, the target 420 may be mounted to a stage 422, that includes a translation mechanism that allows translation of the sample along x and y directions parallel to a plane of the sample and along a z direction perpendicular to the plane of the sample. In such a case, the mechanism 407 may be a simple mechanical mount that spaces the near-field element 406 from the back of the secondary mirror 404 by a sufficient amount that the cavity can be brought into proximity through translation of the sample along the z-axis. Alternatively, the mechanism 407 may be configured to translate the near-field element 406 along the z axis in the direction of the target 420.

In some implementations, the near-field device 405 may include a proximity sensor coupled in a feedback loop to the mechanism 407 and/or to the translation mechanism for the stage 422 to keep a fixed distance from the target 420 to the near field element during near field imaging. By way of example, and not by way of limitation, the distance sensor may be a capacitive sensor with sub-nanometer positioning measurement accuracy.

As shown in FIG. 4, a dedicated fiber 410 can be introduced to the vicinity of the sample 420. The fiber introduction can be done through a dedicated opening in a central obscuration of the objective 400, e.g., though an opening in the secondary mirrors 404. A first end of the dedicated fiber can be optically coupled to the illumination and detection and a second end of the dedicated fiber can be located along an optical axis of the objective 400 between the secondary mirror 404 and a focal point of the objective 400 and coupled to the near field device 406.

The reflective objective 400 described in FIG. 4 can be implemented in an inspection system such as an Optical Coherence Tomography (OCT) interferometer. The near field device can be either mounted independently or in conjunction with additional sensing fibers that can be used for focusing or film thickness measurements.

Figure 5:
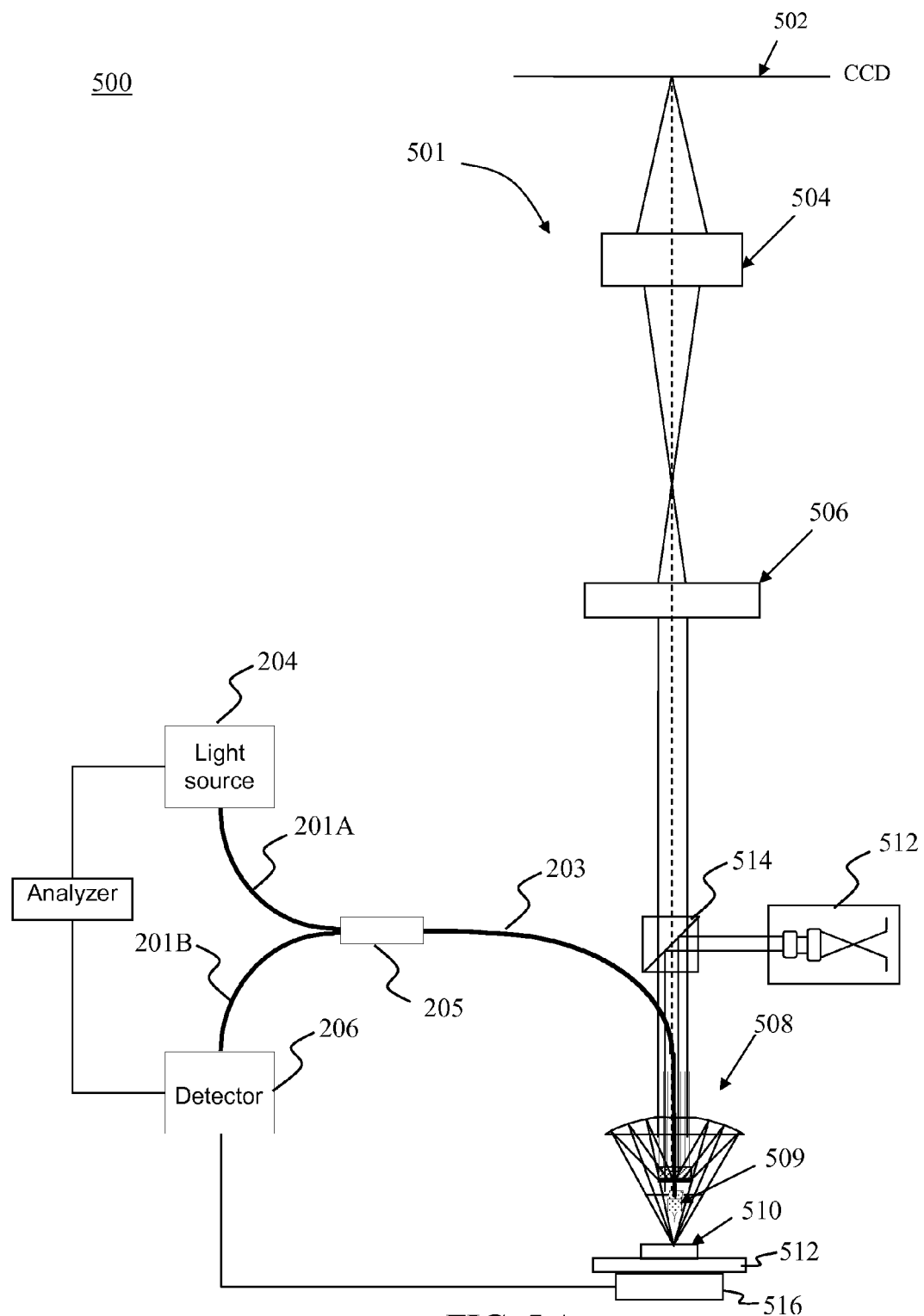
FIGS. 5A-5B are schematic diagrams illustrating a metrology tool including a reflective objective combined with a near field device in accordance with alternative embodiments of the present invention.

FIG. 5A is a schematic diagram illustrating an inspection system 500 according to an embodiment of the present invention. As shown in FIG. 5A, the system 500 includes an optical column 501 comprising an objective 508 in the form of a reflective optical system, which may be configured like the reflective objective 400 described above with respect to FIG. 4. The optical column 501 can include an image detector 502 (e.g., a charge coupled device), coupled by lenses 504 and 506 to the objective 508. In addition, radiation for illuminating a target 510 can be coupled to the target via illumination optics 512 and a beamsplitter 514.

In this embodiment, a light source 204, detector 206 and near-field element 509 can be optically coupled to an optical coupler 205 by dedicated optical fibers 201A, 201B, and 203 respectively for use in a near field sensing mode of the type discussed above with respect to FIG. 2B.

In particular, a first end of the dedicated fiber 203 can be optically coupled to the fiber coupler 205 and a second end of the dedicated fiber is located along an optical axis of the objective 508 between a central obscuration and a focal point of the objective and coupled to the optical cavity of the near field element 509. In operation, a portion of the light from the source 204 (referred to as the focus beam) is coupled to a sample 510 via the fiber coupler 205 and the objective 508. Some energy of the light propagating in the optical cavity of the near field element 509 can be coupled to a target 510 through a small opening in the cavity 509 by evanescent waves. The effect of the coupling on the radiation modes propagating in the cavity can be detected by the detector 206 and analyzed by an analyzer 210.

Figure 5B:
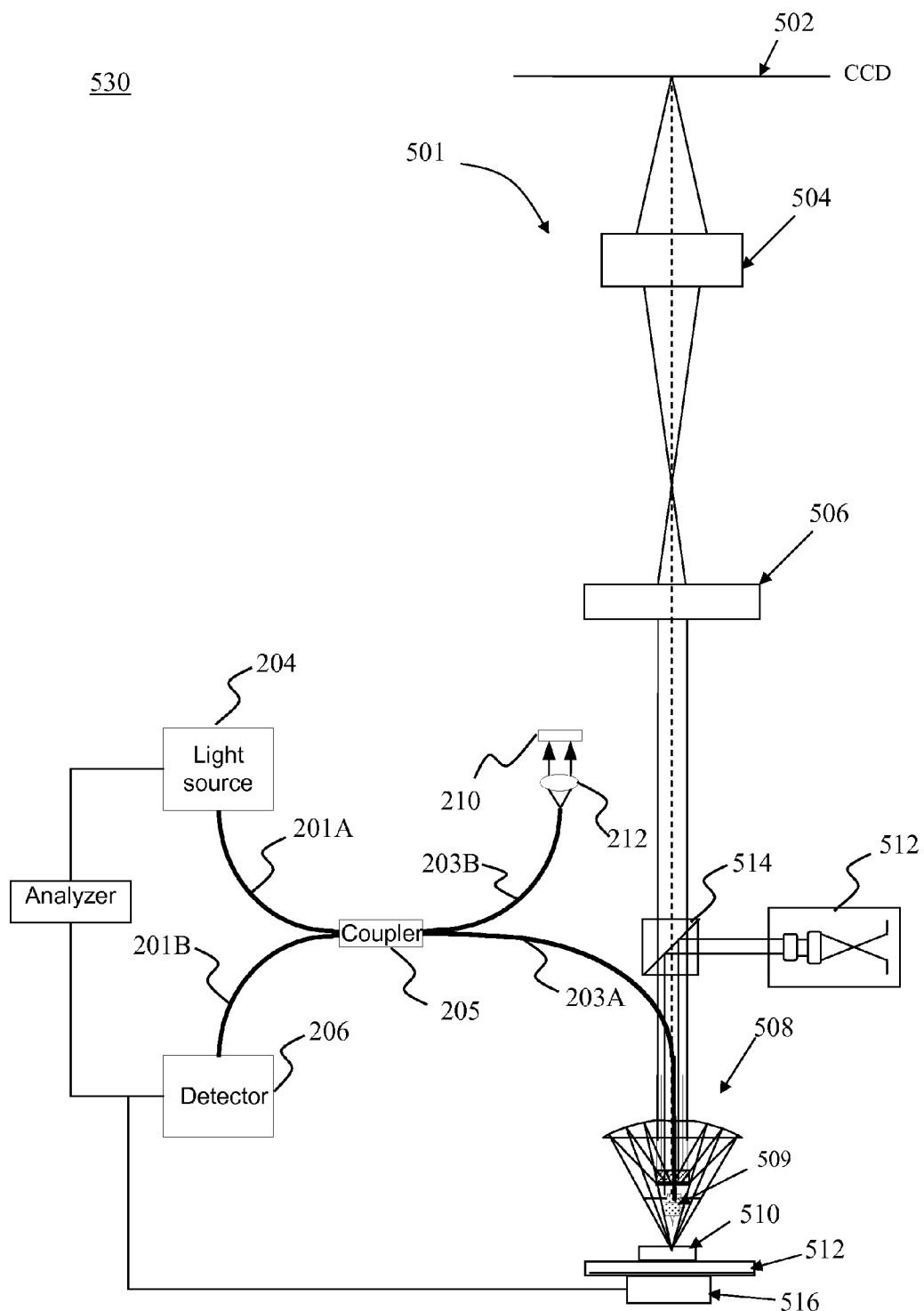

FIG. 5B is a schematic diagram illustrating an inspection system 530 according to an alternative embodiment of the present invention. Similar to system 500 of FIG. 5A, the system 520 includes an optical column 501 comprising an objective 508 in the form of a reflective optical system, which may be configured like the reflective objective 400 described above with respect to FIG. 4, and an image detector 502 coupled by lenses 504 and 506 to the objective 508. In this embodiment, the light source 204, the detector 206, the near field element 509, and a reflector 210 can be optically coupled to by a dedicated optical fibers 201A, 201B, 203A, and 203B respectively to an optical coupler 205. The near field probe can be operated in an interferometer mode, e.g., as discussed above with respect to FIG. 2C.

The systems shown in FIG. 5A and FIG. 5B can also operate in a feedback mode, e.g., by locking on a measured quantity that can be predetermined or selected in train, and shifting the cavity distance from the target to keep the quantity constant. In such a mode, the target 510 can be mounted to a stage 512 that is mechanically coupled to an X, Y, Z translation mechanism 516. A control signal from the detector 206 or analyzer 210 can be coupled to the translation mechanism 516 in a feedback loop. The feedback loop can be configured so that the vertical position Z of the near field element 509 is adjusted as the target is scanned relative to the near field element 509 to keep the signal from the detector constant. The vertical position Z as a function of X and Y can then serve as the sensed information.

In an alternative mode of operation, the target 510 can be scanned relative to the near field element 509 in the X and Y directions while keeping the cavity at a fixed height above the target 510. The signal can then be plotted as a function of X and Y.

It is further noted that in some embodiments, the near field element 509 may be mounted to the objective 508 by a mechanism that allows for some translation of the cavity in the Z direction. For example, the mechanism 407 referred to above with respect to FIG. 4 may include a piezoelectric element that can move the near field element 509 by small amounts in the Z direction in a controlled fashion. In such a configuration, the above-described feedback mode may be implemented by deriving a control signal for the mechanism 407 from a signal obtained by the detector to implement the feedback loop.

Other variations on the embodiments described above are possible and within the scope of embodiments of the present invention. For example, embodiments of the present invention are not limited to those that use an optical cavity as the near field element. Alternatively, other near-field optical elements, such as sub-wavelength apertures or superlenses may be used as the near field element that is located in an obscuration of an objective in a metrology tool. FIGS. 6A-6B, illustrate examples of the use of a sub-wavelength aperture element 606 in place of an optical cavity as the near-field imaging element. A highly collimated beam of Gaussian or low numerical aperture incident radiation 601 is coupled to the sub-wavelength aperture element 606. Generally, the sub-wavelength aperture element 606 has an aperture 603 that is smaller than the wavelength (or wavelengths) of radiation in the incident radiation 601. Alternatively the sub-wavelength aperture element 606 may include an array of two or more sub-wavelength apertures, as described below with respect to FIGS. 6C-6D. Evanescent waves can couple energy from the incident radiation to a target that is sufficiently close to the aperture 606.

As seen in FIG. 6B, a near field device 605 including the sub-wavelength aperture element 606 can be mounted in a central obscuration of a reflective objective having a primary mirror 602 and a secondary mirror 604. Incident radiation 601 for near-field illumination can be introduced to the sub-wavelength aperture element 606 through an optical path established with free-space optical elements such as a beam splitter 614. The incident radiation can travel through central openings in the primary mirror 602 and secondary mirror 604. The near-field device 605 may include a mechanism 607 that mounts sub-wavelength aperture element to the secondary mirror 604. The mechanism 607 may include a piezoelectric tube (pzt) to provide for vertical translation of the sub-wavelength aperture element along a z-direction. In addition, a target 610 can be mounted to a translation stage 616 to allow for vertical and horizontal translation to bring a selected portion of the target into sufficiently close proximity to the sub-wavelength aperture element 606 so that evanescent waves can couple between the target 610 and the sub-wavelength aperture element 606.

In alternative embodiments of the present invention, the sub-wavelength aperture element 606 may include a regular array of sub-wavelength apertures having a characteristic spacing pattern. For example, as shown in FIG. 6C, the sub-wavelength aperture element 606 may include a regular rectangular array of circular sub-wavelength apertures with a regular spacing (e.g., 1 micron) between adjacent apertures. Alternatively, as depicted in FIG. 6D, the sub-wavelength aperture element 606 may include a regular rectangular array of several microns long linear sub-wavelength apertures with a regular periodic spacing (e.g., 1 micron) between adjacent linear apertures.

The near-field detection system may image the sub-wavelength apertures. If each of the circular apertures 603 in FIG. 6C is, say, 40 nanometers in diameter, light emanating from each aperture represents a 40 nm point on the target. The sub-wavelength aperture element may be scanned across the target, e.g., by scanning the target in the x and y directions in grid-like increments. In this manner one could map a whole region of the target 610 in increments of 100 nm. Since each measurement includes parallel information from all of the apertures in the element 606 a considerable amount of information about the target can be obtained in a relatively short period of time. For example, if the target 610 is scanned with a resolution of 100 nm the time for scanning the target can be reduced by a factor of the number of apertures in the element 606. As seen in FIG. 6D, one could do a similar thing if the subs-wavelength aperture element 606 contained a grid of linear apertures. Such a configuration may be useful since many targets are also composed of lines. The linear apertures 603 can be aligned with linear features 603' on the target and the target 610 may be scanned relative to the sub-wavelength aperture element 606 along a direction perpendicular to both the linear apertures and the linear features.

Figure 7:
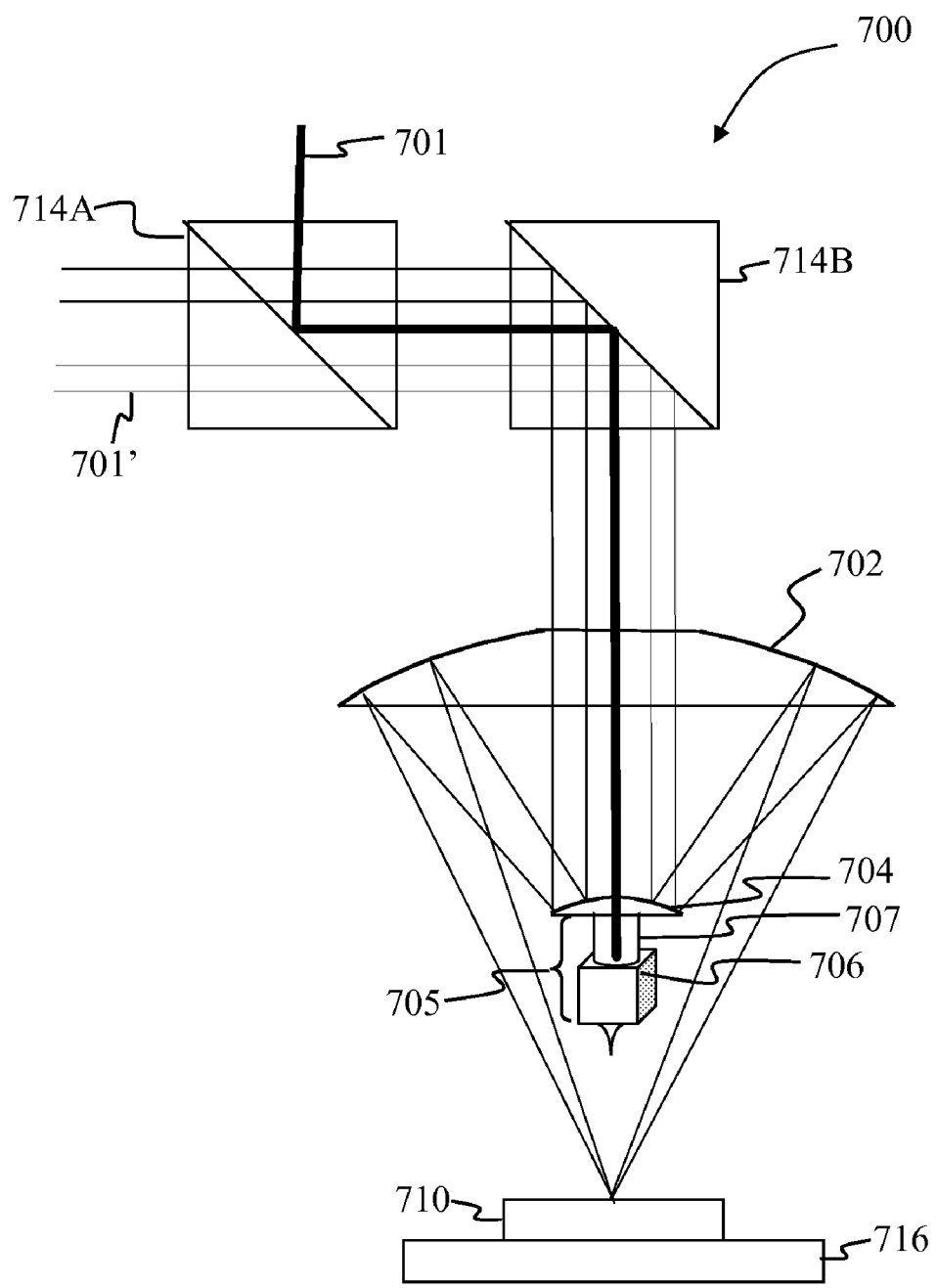
FIG. 7 is a schematic diagram illustrating an example of a near-field illumination scheme that may be used in conjunction with embodiments of the present invention.

Embodiments of the present invention include configurations that allow use of different wavelengths in the near field illumination and detection in an apparatus of the type shown in FIG. 6B. For example, as seen in FIG. 7, a common free-space optical path may be used to introduce both standard illumination and near-field illumination in a device 700 having a near-field device 705 disposed in a central obscuration of a reflective objective having a primary mirror 702 and a secondary mirror 704. The near field device 705 may include a near-field element 706 such as a sub-wavelength aperture element, an optical cavity having one or more sub-wavelength apertures, or a superlens. The near-field element 706 can be mounted to the secondary mirror by a positioning mechanism 707. A target 710 can be mounted to a translation stage 716. The positioning mechanism and/or translation stage 716 can provide for vertical and horizontal translation to bring a selected portion of the target into sufficiently close proximity to the near-field element 706 so that evanescent waves can couple between the target 710 and the near-field element 706.

Standard illumination 701' and near-field illumination 701 may be selectively introduced to the objective or the near-field element 706 through a dichroic beamsplitter 714A and a regular beamsplitter 714B. The dichroic beamsplitter 714A can be transparent to the wavelengths of radiation used for the standard illumination 701' in the objective and reflective for wavelengths used for the near-field illumination in the near field element 706. The regular beamsplitter 714B can reflect a portion of the standard illumination 701' toward the objective for focusing onto the target 710. Standard illumination scattered by the target and collected by the objective can also pass through the regular beamsplitter 714B into an imaging optical column (not shown).

Figure 8A:
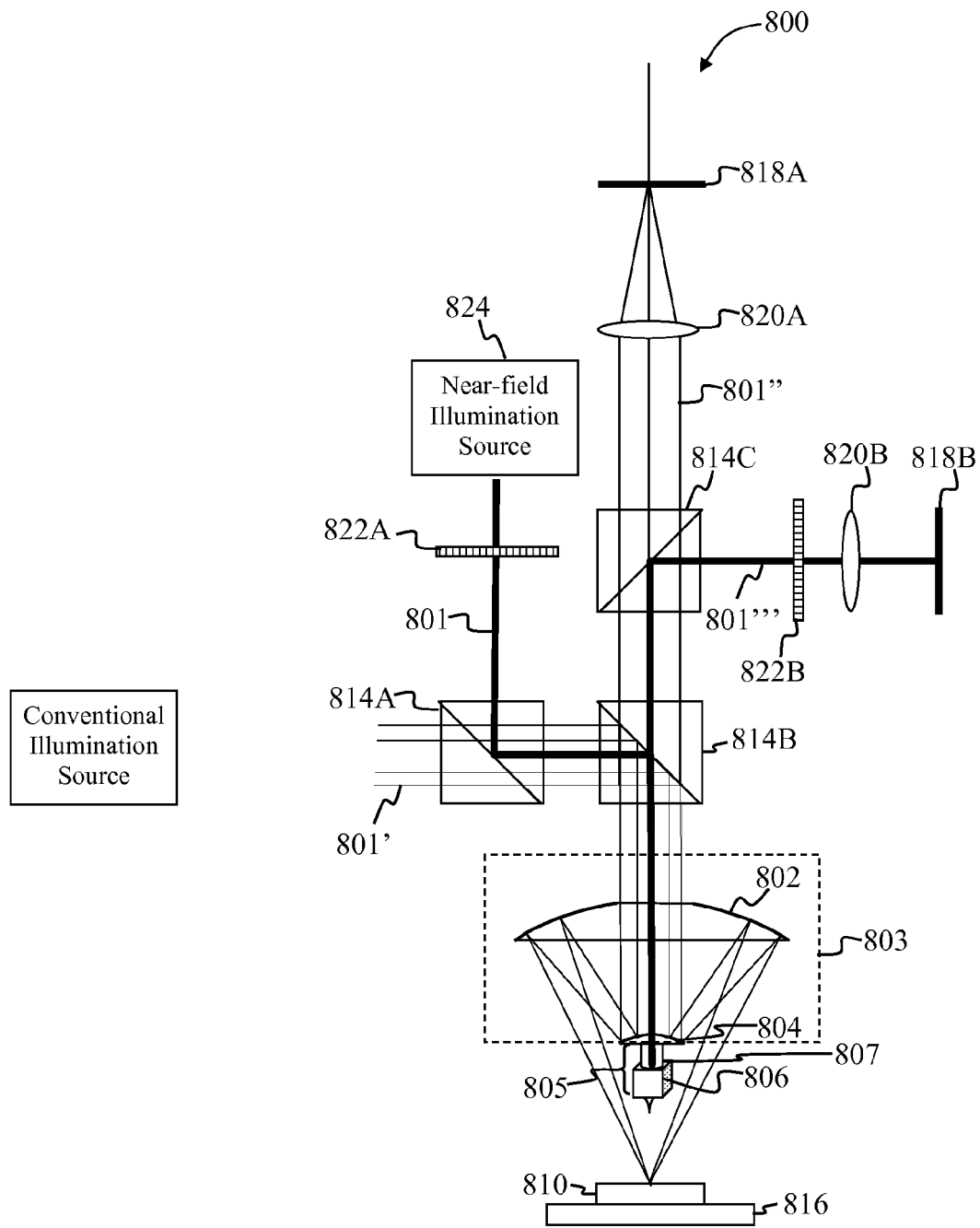
FIGS. 8A-8C are schematic diagrams illustrating the use of various near-field illumination schemes in a metrology tool having a reflective objective and near-field element in accordance with another alternative embodiment of the present invention.

Several variations on the basic configuration shown in FIGS. 6A-6B and FIG. 7 are possible. For example, as shown in FIG. 8A, a metrology tool 800 may introduce standard illumination 801' and near-field illumination 801 through a first dichroic beam splitter 814A and a regular beamsplitter 814B configured as shown in FIG. 7. Standard illumination scattered by the target 810 can be collected by an objective 803, which may include a primary mirror 802 and secondary mirror 804. This scattered standard illumination 801" can also pass through the regular beamsplitter 814B and a second dichroic beamsplitter 814C into an imaging optical column and focused onto a standard imaging detector 818A such as a charge coupled device (CCD) using one or more optical components 820A, such as a tube lens.

The near field illumination 801 can be reflected by the dichroic beamsplitter 814A and the regular beamsplitter 814B to a near-field optical device 805 positioned in a central obscuration of the objective 803. The near-field device can include a near-field element 806 and positioning mechanism 807. The near-field illumination 801 interacts with a target 810 to produce a near field signal 801'''. The near field signal can be reflected by the second dichroic beamsplitter 814C to a near field signal collection optics 820B and detected by a second detector 818B. In some implementations, a known polarization may optionally be introduced to the near-field illumination 801 e.g., by passing the near-field illumination through a polarizer 822A located between a near field illumination source 824 and the first dichroic beamsplitter 814A. The polarization of the near-field signal 801' may be analyzed by passing the near-field signal 801''' through an analyzer 822B having a known polarizing direction and observing the effect of the polarizing directions of the polarizer 822A and analyzer 822B on the signal detected by the near-field detector 818.

Figure 8B:
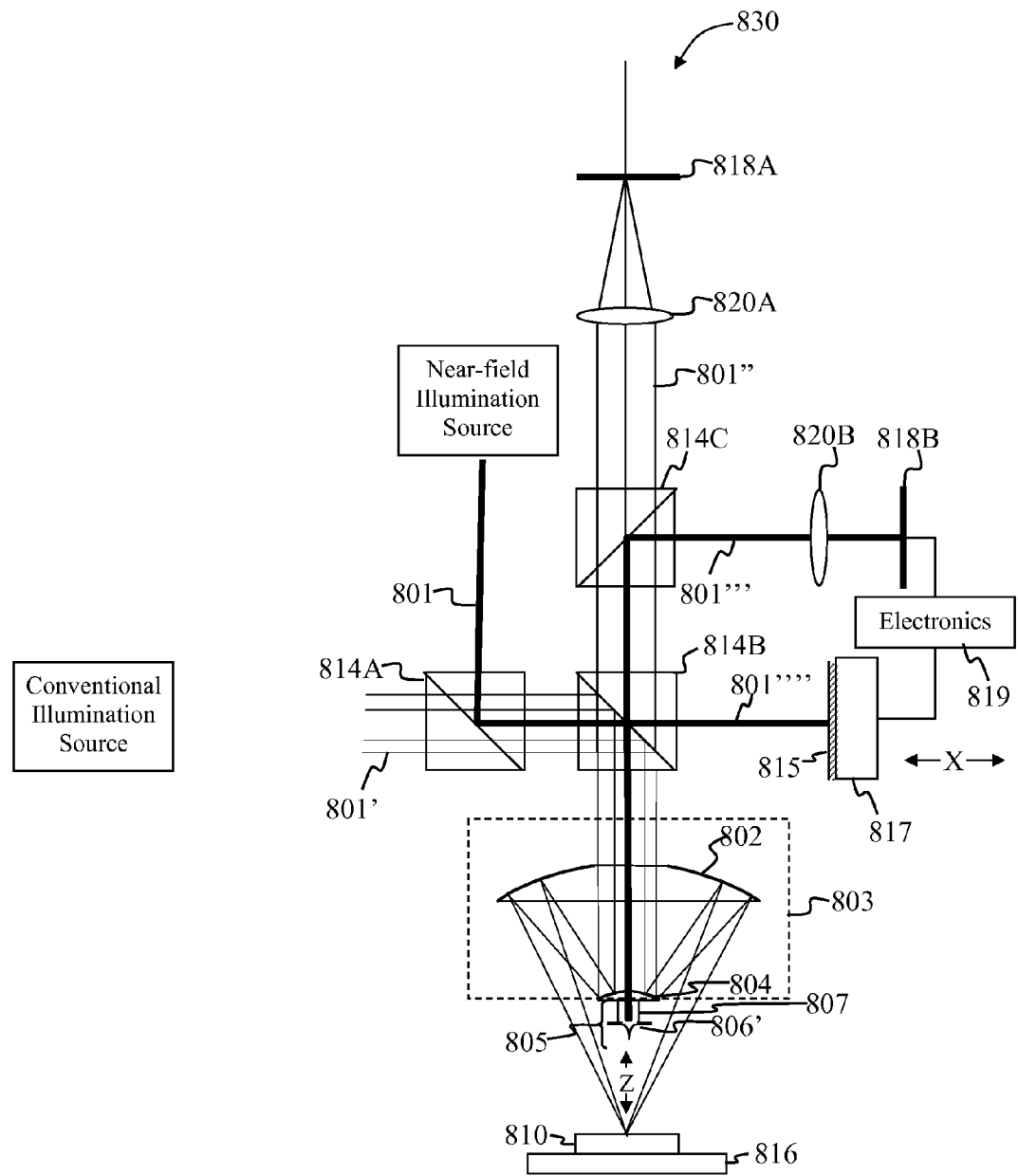
Figure 8C:
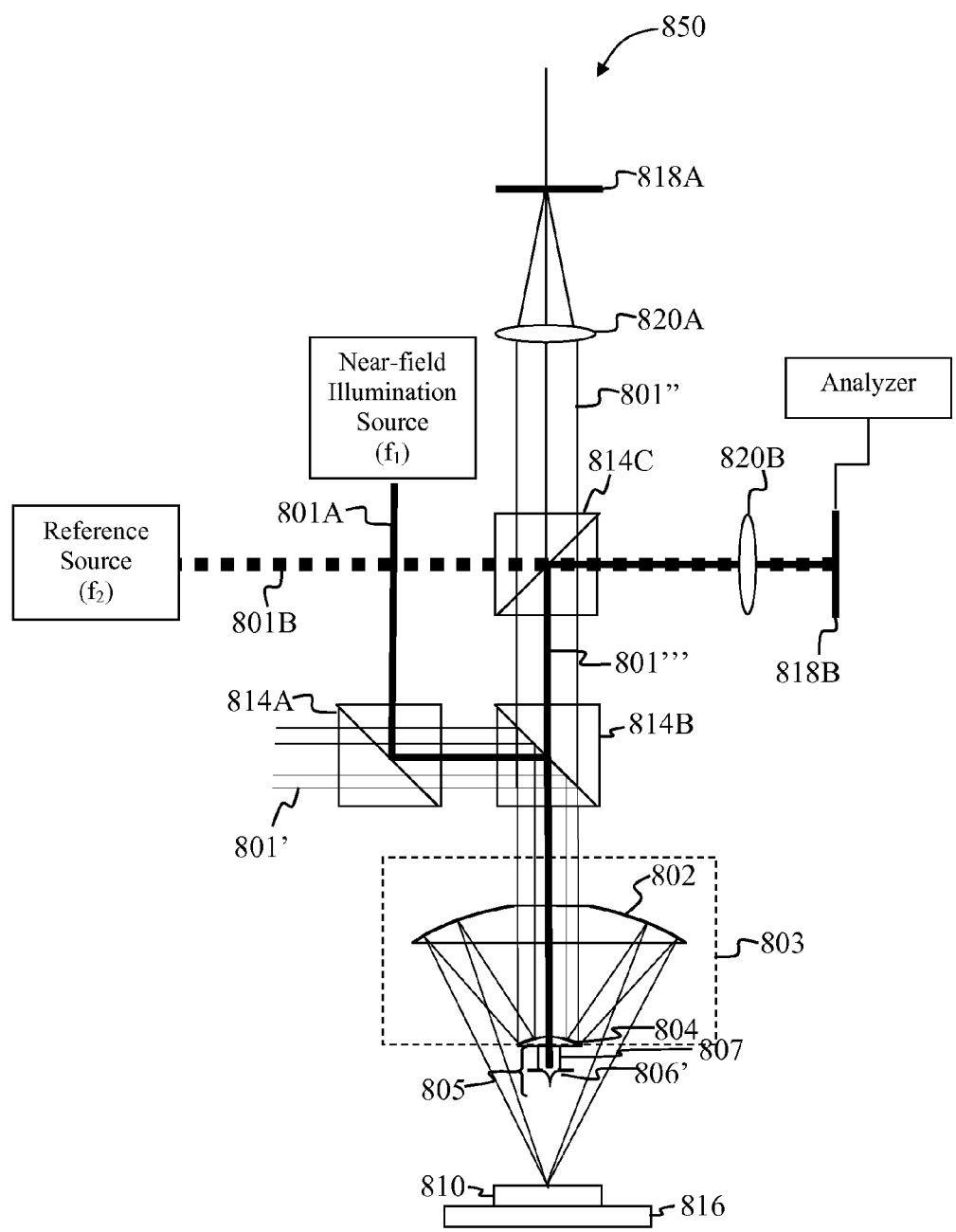

A potential issue in embodiments of the present invention is the presence of background noise from near-field illumination that is scattered by the near field element into the near field detection optics. FIG. 8B and FIG. 8C illustrate but two examples of schemes for reducing such noise. In examples depicted in FIGS. 8B-8C, the near field element 806' in the near field device 805 may be a simple sub-wavelength aperture. However, the techniques used in these examples may also be used with other near field elements such as optical cavity-type near-field elements or superlenses.

By way of example, FIG. 8B illustrates a metrology tool 830 that utilizes a phase difference between photons reflected from the near-field element for background rejection. If the near-field illumination has enough coherence, the reflected background photons have a defined phase while photons that participated in the near field process at the target 810 accumulate additional phase due to the extra path and the interaction with the target. These photons contain information about the target. The defined phase of the background photons can be used for background subtraction by interferometric means. In particular, a reference beam 801'''' can be prepared with an extra 180 degrees of phase relative to the background photons to and add phase contrast to the near field signal.

In the example depicted in FIG. 8B, the metrology tool 830 may utilize a sub-wavelength aperture 806' as a near-field element. A reference mirror 815 can be optically coupled to the second dichroic beamsplitter 814C in an interferometer configuration. The second dichroic beamsplitter 814C can be mounted to a translation mechanism 817 such as a pzt for movement in the z-direction for 180 degree phase locking of a reference beam to the background reflected near-field illumination. Alternatively, the phase locking may be accomplished by translating the reference mirror 815 along the x direction. The translating mechanism 817 may be controlled by suitable electronics 819 coupled to the near-field detector 818B to maintain the desired phase relationship and optimize the signal to noise ratio. Some of the near-field illumination makes it through the sub-wavelength aperture element 806' to the target as evanescent waves and accumulates phase. The illumination that makes it furthest into the target is least affected by the interferometric background cancellation.

An alternative scheme for a metrology tool 850 may implement background noise rejection based on a heterodyne effect as illustrated in FIG. 8C. In this embodiment the target 810 may receive near-field illumination 801A of frequency $f_1$ and the near-field signal 801' can be coupled to the near-field detector 818B as described above. A reference signal 801B of a different frequency $f_2$ can also be coupled to the near-field detector 818B. The two frequencies $f_1$ and $f_2$ may be displaced by a frequency difference that is in the range of the detection electronics 819, e.g., 100 MHz. When the near-field signal 801' and the reference signal 801B are detected by the detector the resulting detector signal can be characterized by a heterodyne beat frequency. The DC component of the detector signal can be rejected. The photons in the near-field signal 801''' that participate in the near field interaction with the target 810 can have different phase from most of the background photons that were reflected by the near-field element 806' without interacting with the target. The detector electronics 819 can detect this phase difference as a corresponding change in phase of the heterodyne signal measured by the detector 818B. Thus, rejecting the AC signal with the phase that corresponds to the background signal leaves only AC signal that corresponds to the near field photons and has intensity, phase and possibly polarization information obtained from the target.

If the sub-wavelength element 806 includes an array of apertures, e.g., as discussed above with respect to FIGS. 6A-6D, the electronics 819 can include an array of AC detectors configured to measure the phase delay per aperture in the sub-wavelength aperture array and reject the DC signal.

Techniques for rejecting background noise in embodiments of the present invention are not limited to those illustrated in FIG. 8B and FIG. 8C. Other background rejection techniques are within the scope of embodiments of the present invention. Such techniques include, but are not limited to, positioning the sub-wavelength aperture on a highly absorptive material or anti-reflection (AR) coated material. Alternatively the sub-wavelength aperture may be located within a linear or concentric grating that diffracts some of the reflected near-field illumination into higher undetectable orders.

Figure 9A:
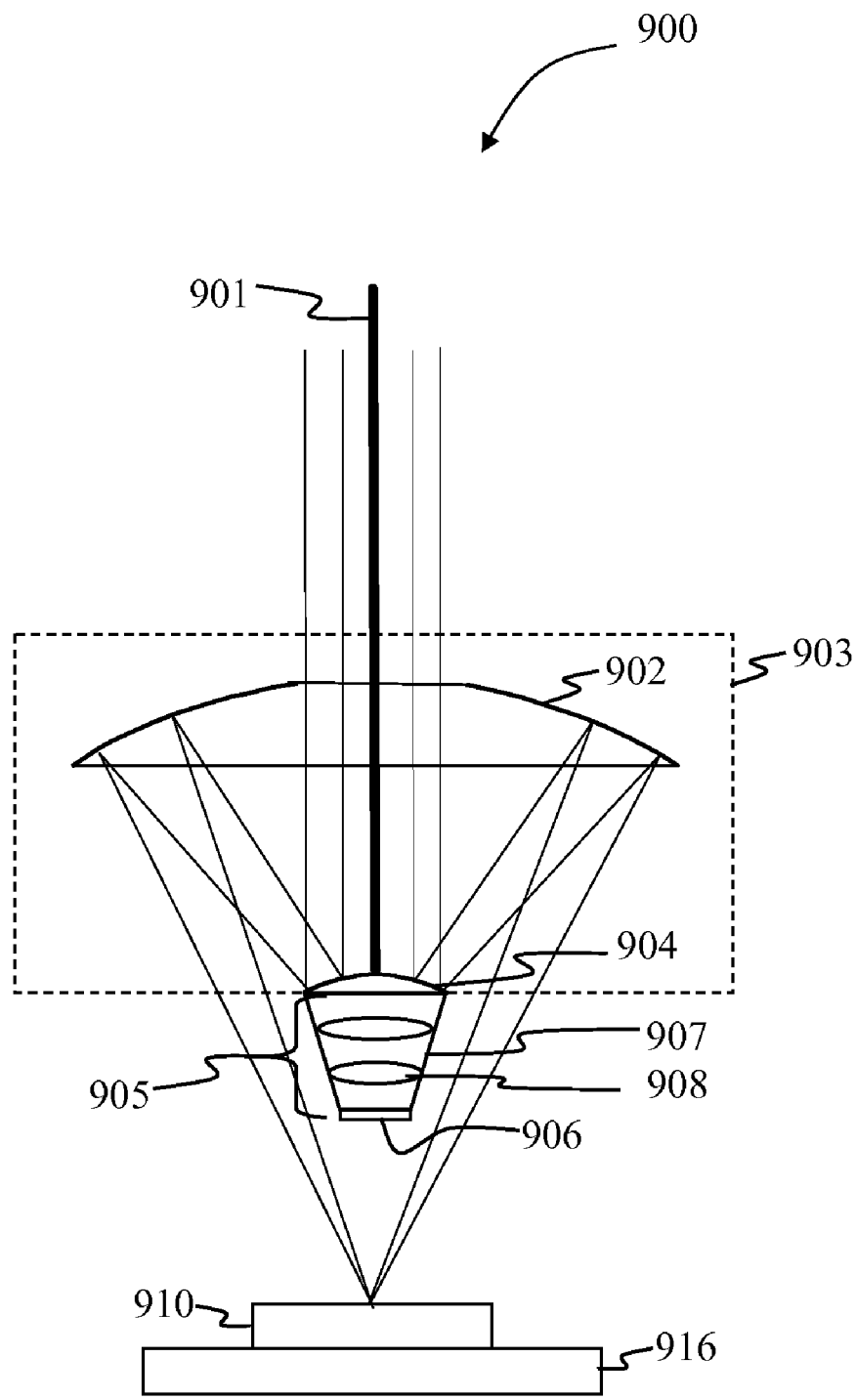
FIG. 9A is a schematic diagram illustrating the use of various a superlens in conjunction with a reflective objective in accordance with another alternative embodiment of the present invention.

Embodiments of the present invention include configurations that use far-field superlens in conjunction with a conventional objective so that both conventional imaging and near-field imaging may be done using the same imaging optical column. For example, as seen in FIG. 9A, an objective system 900 may include a near-field device 905 having a far-field superlens as a near-field element 906 can be disposed in a central obscuration of a reflective objective 903. The objective may include a primary mirror 902 and a secondary mirror 904. The superlens 906 can be mounted to the secondary mirror by a positioning structure 907. A target 910 can be mounted to a translation stage 916. The translation stage 916 can provide for vertical and horizontal translation to bring a selected portion of the target into sufficiently close proximity to the superlens 906 so that evanescent waves can couple between the target 910 and the superlens 906. If the superlens 906 is a far-field superlens, the evanescent waves can be converted to propagating waves and imaged using the same optical column as for standard imaging with the objective 903.

Figure 9B:
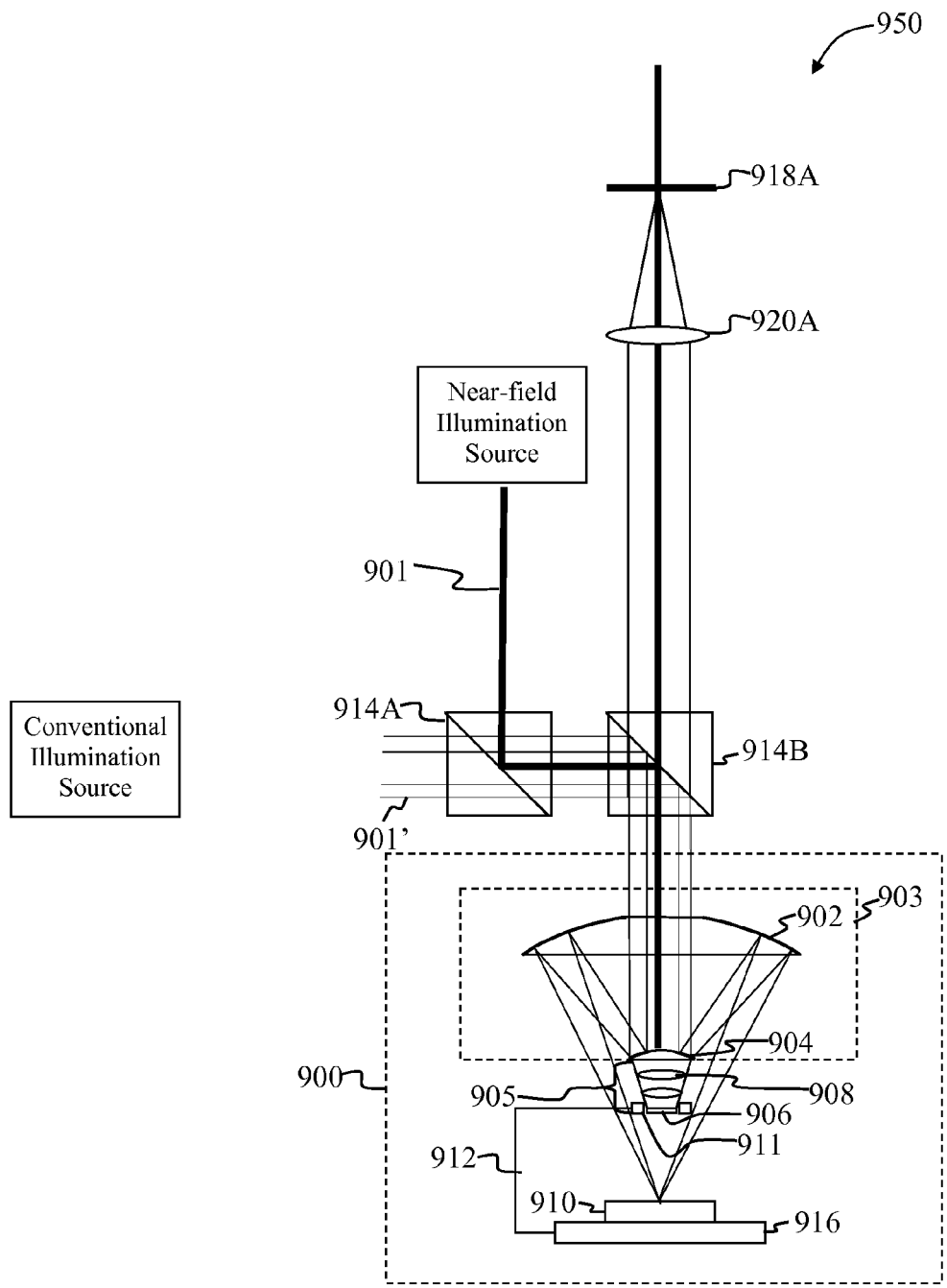
FIG. 9B is a schematic diagram illustrating an example of a metrology tool with a reflective objective and far-field superlens in accordance with another alternative embodiment of the present invention.

As seen in FIG. 9B, in a metrology tool 950 standard illumination 901' and near-field illumination 901 may be selectively introduced to the objective or to superlens 906 through a dichroic beamsplitter 914A and a regular beamsplitter 914B. The dichroic beamsplitter 914A can be transparent to the wavelengths of radiation used for the standard illumination 901' in the objective and reflective for wavelengths used for the near-field illumination in the superlens 906. The regular beamsplitter 914B can reflect a portion of the standard illumination 901' toward the objective for focusing onto the target 910. Standard illumination scattered by the target and collected by the objective can also pass through the regular beamsplitter 914B into an imaging optical column The near-field device may include one or more additional optical elements 908 configured to optically couple propagating waves from the superlens 906 into the imaging optical column. Such propagating waves can be collected by standard optical elements 920A and imaged onto the same imaging detector 918A as is used for standard imaging with the objective. By way of example, and not by way of limitation, the optical elements may include a dichroic mirror as the secondary mirror 904. Such a dichroic mirror can be configured to transmit a first range of wavelengths used during near-field imaging of the target 910 with the superlens 906 and to reflect a second range of wavelengths used during conventional imaging of the target with the objective.

In some implementations, the near-field device 905 may include a proximity sensor 911, sensor coupled in a feedback loop 912 to translation stage 916 to keep a fixed distance from the target 910 to the superlens 906 during near field imaging. By way of example, and not by way of limitation, the proximity sensor 911 may be a capacitive sensor with sub-nanometer positioning measurement accuracy.

The use of near field based metrology in combination with existing optical metrology and inspection techniques opens a new realm of opportunities for accurate nanometer scale metrology as by combining the maturity and flexibility of optical technologies with the capability of measuring deeply sub-wavelength features.

The reader's attention is directed to all papers and documents which are filed concurrently with this specification and which are open to public inspection with this specification, and the contents of all such papers and documents incorporated herein by reference.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. An optical metrology tool, comprising:
   a source of electromagnetic radiation having a characteristic wavelength;
   an objective having a central obscuration;
   a near field optical probe located within the central obscuration of the objective, wherein the near field optical probe includes a near field optical element, and a mechanism configured to bring the near field optical element into proximity to the target, wherein a characteristic dimension of the near field optical element is smaller than the wavelength of the electromagnetic radiation, wherein the characteristic dimension is sufficiently small that when the electromagnetic radiation passes through the near field optical element and the near field optical element is in sufficient proximity to the target evanescent waves couple energy from the radiation in the cavity to the target; and
   an electromagnetic radiation detector coupled to the near-field optical element, wherein the detector is configured to detect an optical signal due to coupling of the evanescent waves to the target and generate a corresponding output signal.

2. The optical metrology tool of claim 1, wherein the near field optical element is an optical cavity with at least one opening configured to face a target, wherein the characteristic dimension is a size of the opening, wherein, wherein the detector is configured to detect a difference in the electromagnetic radiation in the optical cavity due to coupling of the evanescent waves to the target and generate a corresponding difference signal.

3. The optical metrology tool of claim 1 wherein the near field optical element is a sub-wavelength aperture.

4. The optical metrology tool of claim 1 wherein the near field optical element includes a regular array of sub-wavelength apertures.

5. The optical metrology tool of claim 4 wherein the apertures in the regular array are linear apertures.

6. The optical metrology tool of claim 1 wherein the near field optical element is a superlens.

7. The optical metrology tool of claim 6 wherein the superlens is a far field superlens.

8. The optical metrology tool of claim 7 further comprising optics configured to couple the optical signal due to coupling of the evanescent waves to the target to the objective.

9. The optical metrology tool of claim 8 wherein the optics include a dichroic mirror in the objective that is configured to transmit a first range of wavelengths used during near-field imaging of the target and to reflect a second range of wavelengths used during conventional imaging of the target with the objective.

10. The optical metrology tool of claim 1 further comprising an interferometer coupled to the near-field illumination, wherein the interferometer is configured to introduce a 180 degree phase difference between background near-field illumination reflected by the near-field element and near-field radiation that has interacted with the target.

11. The optical metrology tool of claim 1 further comprising sources for first and second near field illumination wavelengths and detector electronics coupled to a near-field signal detector, wherein the first and second near-field illumination wavelengths have a frequency difference that is small enough to produce a heterodyne beat note when the first and second wavelengths are detected by the target wherein the beat note is characterized by a frequency that is within a range of detection by detector electronics, and wherein the electronics are configured to detect a phase difference in the beat note due to a difference in phase between background near-field illumination reflected by the near field element and a near field signal containing information from an interaction between the near-field illumination and the target.

12. The optical metrology tool of claim 1, further comprising an analyzer coupled to the detector, wherein the analyzer is configured to analyze the difference signal in terms of intensity, wavelength, polarization, or phase of the electromagnetic radiation to determine one or more characteristics of the sample.

13. The optical metrology tool of claim 1, further comprising an image detector optically coupled to the objective.

14. The optical metrology tool of claim 13, further comprising an illumination source optically coupled to the objective.

15. The optical metrology tool of the claim 1, further comprising a source of electromagnetic radiation wherein the near field optical probe is optically coupled to the source of electromagnetic radiation, wherein the source of electromagnetic radiation and the detector are respectively optically coupled by first and second fibers to an optical coupler and wherein the optical cavity is optically coupled by a third fiber to the optical coupler.

16. The optical metrology tool of claim 1, further comprising a source of electromagnetic radiation wherein the near field optical probe is optically coupled to the source of electromagnetic radiation, wherein the source of electromagnetic radiation, the optical cavity, a reference optical path, and the detector are optically coupled in an interferometer configuration in which the optical cavity is part of a sample beam path.

17. The optical metrology tool of claim 16, wherein the interferometer configuration includes an optical coupler connected to first, second, third, and fourth optical fibers,
   wherein in the sample beam path, the source of electromagnetic radiation is optically coupled to the optical cavity via the first fiber, the optical coupler and the second fiber, and the detector is optically coupled to the optical cavity via the second fiber, the optical coupler, and the third fiber; and
   wherein in the reference beam path, the source is optically coupled to a reflector via the first fiber, the coupler, and the fourth fiber, and the reflector is optically coupled to the detector via the fourth fiber, the coupler, and the third fiber.

18. The optical metrology tool of claim 1, wherein the at least one opening includes one or more spot openings characterized by a diameter that is smaller than the characteristic wavelength of the electromagnetic radiation.

19. The optical metrology tool of claim 18, further comprising a scanning mechanism configured to scan the near field optical probe relative to the target in one or more directions parallel to a plane of the target.

20. The optical metrology tool of claim 1, wherein the at least one opening includes one or line openings and the characteristic dimension is a width of the line openings, wherein the width is smaller than the characteristic wavelength of the electromagnetic radiation.

21. The optical metrology tool of claim 1, wherein the objective is a reflective objective having a focusing mirror.

22. The optical metrology tool of claim 21, wherein the near field optical probe is mounted inside the reflective objective.

23. The optical metrology tool of claim 22, wherein the reflective objective includes a secondary mirror optically coupled to the focusing mirror, wherein the near field optical probe is mounted in an obscuration area created by the secondary mirror.

24. The optical metrology tool of claim 21 wherein the near field device is mounted between the objective and the target.

25. The optical metrology tool of claim 1 wherein the optical cavity includes a gold foil having a thickness of about 100 nanometers or less.

* * * * *